United States Patent
Ohtomo et al.

(10) Patent No.: US 10,983,196 B2
(45) Date of Patent: Apr. 20, 2021

(54) LASER SCANNER AND SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 367 days.

(21) Appl. No.: 16/011,697

(22) Filed: Jun. 19, 2018

(65) Prior Publication Data

US 2019/0011536 A1 Jan. 10, 2019

(30) Foreign Application Priority Data

Jul. 6, 2017 (JP) .............. JP2017-132948

(51) Int. Cl.
*G01S 7/48* (2006.01)
*G01S 7/481* (2006.01)
(Continued)

(52) U.S. Cl.
CPC .......... *G01S 7/4817* (2013.01); *G01C 11/025* (2013.01); *G01C 15/002* (2013.01);
(Continued)

(58) Field of Classification Search
USPC .............................. 356/4.01, 5.01
See application file for complete search history.

(56) References Cited

U.S. PATENT DOCUMENTS

| 8,130,368 B2* | 3/2012 | Eno | G01S 7/4813 356/3.01 |
| 8,379,930 B2* | 2/2013 | Chang | G01S 17/08 382/106 |

(Continued)

FOREIGN PATENT DOCUMENTS

| EP | 3182160 A1 | 6/2017 |
| JP | 2016-151422 A | 8/2016 |

(Continued)

OTHER PUBLICATIONS

English Machine Translation of JP-2017090244-A (Year: 2017).*
European communication dated Dec. 4, 2018 in corresponding European patent application No. 18179786.1.

*Primary Examiner* — James R Hulka
(74) *Attorney, Agent, or Firm* — . Nields, Lemack & Frame, LLC

(57) ABSTRACT

A laser scanner comprising a distance measuring light projecting unit for emitting at least two distance measuring lights at a known deflection angle with respect to a projecting optical axis, a distance measuring unit for receiving at least two reflected distance measuring lights and performing a distance measurement, respectively, an optical axis deflector for deflecting optical axes of the distance measuring lights and the reflected distance measuring lights at the same deflection angle in the same direction, a projecting direction detecting module for deflecting a deflection angle and a deflecting direction by the optical axis deflector, and an arithmetic control module, wherein the arithmetic control module performs a two-dimensional scanning with the distance measuring lights, draws at least two loci on a plane to be measured, and measures the plane to be measured along at least the two loci substantially at the same time by the distance measuring unit.

23 Claims, 11 Drawing Sheets

(51) Int. Cl.
  *G01C 15/00* (2006.01)
  *G01S 17/89* (2020.01)
  *G01S 17/42* (2006.01)
  *G01C 11/02* (2006.01)

(52) U.S. Cl.
  CPC .......... *G01C 15/006* (2013.01); *G01S 7/4808* (2013.01); *G01S 7/4815* (2013.01); *G01S 7/4818* (2013.01); *G01S 17/42* (2013.01); *G01S 17/89* (2013.01)

(56) References Cited

U.S. PATENT DOCUMENTS

| | | | | |
|---|---|---|---|---|
| 9,915,733 | B2 * | 3/2018 | Fried | G01S 17/42 |
| 10,048,377 | B2 * | 8/2018 | Ohtomo | G01C 15/008 |
| 10,088,307 | B2 * | 10/2018 | Ohtomo | G01S 17/89 |
| 10,101,441 | B2 * | 10/2018 | Ohtomo | G01S 17/36 |
| 10,107,912 | B2 * | 10/2018 | Ohtomo | G01S 7/4915 |
| 10,281,580 | B2 * | 5/2019 | Ohtomo | G01S 7/4812 |
| 10,310,059 | B2 * | 6/2019 | Kiryuu | G01S 17/42 |
| 10,605,600 | B2 * | 3/2020 | Nishita | G01S 17/66 |
| 2009/0052288 | A1 | 2/2009 | Eno et al. | |
| 2011/0158481 | A1 * | 6/2011 | Chang | G01S 17/08 382/106 |
| 2016/0238385 | A1 | 8/2016 | Ohtomo et al. | |
| 2016/0238708 | A1 | 8/2016 | Ohtomo et al. | |
| 2016/0259039 | A1 | 9/2016 | Ohtomo et al. | |
| 2016/0266254 | A1 | 9/2016 | Ohtomo et al. | |
| 2016/0356890 | A1 | 12/2016 | Fried et al. | |
| 2017/0131404 | A1 | 5/2017 | Ohtomo et al. | |
| 2017/0285144 | A1 * | 10/2017 | Kiryuu | G01C 15/002 |

FOREIGN PATENT DOCUMENTS

| | | | |
|---|---|---|---|
| JP | 2016-151423 A | 8/2016 | |
| JP | 2016-161411 A | 9/2016 | |
| JP | 2016-169985 A | 9/2016 | |
| JP | 2017090244 A * | 5/2017 | ........... G01C 15/002 |
| WO | 2004/099849 A1 | 11/2004 | |

* cited by examiner

LASER SCANNER AND SURVEYING SYSTEM

BACKGROUND OF THE INVENTION

The present invention relates to a laser scanner and a surveying system for acquiring three-dimensional point cloud data of a plane to be measured.

For example, in a case where a topography of a plane to be measured such as a ground or the like is measured, a laser scanner is mounted on a moving body such as an unmanned aerial vehicle or the like, the plane to be measured is scanned by the laser scanner, three-dimensional point cloud data is acquired, and the topography of the plane to be measured is measured.

However, the laser scanner mounted on the moving body is usually a one-dimensional laser scanner. Therefore, in order to scan the plane to be measured by the laser scanner and acquire accurate three-dimensional point cloud data, the moving body must move at a constant speed, and a means for measuring an attitude of the laser scanner such as a tilt and the like need to be additionally provided.

Therefore, a control of a moving speed of the moving body and a device configuration of the laser scanner mounted on the moving body become complicated, and the device itself becomes expensive.

SUMMARY OF THE INVENTION

It is an object of the present invention to provide a laser scanner and a surveying system which enable to detect a tilt and a rotation with respect to a plane to be measured based on a measurement result by enabling to measure a plurality of points of the plane to be measured at the same time.

To attain the object as described above, a laser scanner according to the present invention comprises a distance measuring light projecting unit having a projecting optical axis and having light emitters for emitting at least two distance measuring lights at a known deflection angle with respect to the projecting optical axis, a distance measuring unit for receiving at least two reflected distance measuring lights and performing a distance measurement, respectively, an optical axis deflector provided on a common optical path of the distance measuring lights and the reflected distance measuring lights and for deflecting optical axes of the distance measuring lights and the reflected distance measuring lights at the same deflection angle in the same direction, a motor for rotating the optical axis deflector with the common optical path as a center, a projecting direction detecting module for detecting a deflection angle and a deflecting direction by the optical axis deflector, and an arithmetic control module, wherein the arithmetic control module performs a two-dimensional scanning with the distance measuring lights by a rotation of the optical axis deflector, draws at least two loci on a plane to be measured, and measures the plane to be measured along at least the two loci substantially at the same time by the distance measuring unit.

Further, in the laser scanner according to a preferred embodiment, the distance measuring light projecting unit shifts light emission timings by a time division and pulsed-emits the distance measuring lights.

Further, in the laser scanner according to a preferred embodiment, the distance measuring light projecting unit emits at least three distance measuring lights, and the arithmetic control module calculates, based on a distance measurement result of at least three points measured on each of the loci at the same time and a detection result of the projecting direction detecting module, distances and altitudes between each of the points and calculates a tilt and a rotation with respect to the plane to be measured based on a calculation result.

Further, in the laser scanner according to a preferred embodiment, the two-dimensional scanning is a circular scanning.

Further, in the laser scanner according to a preferred embodiment, the arithmetic control module calculates a point where a side length between at least two points on each of the loci measured at a predetermined measuring position at the same time becomes equal to a side length between at least two points on each of the loci measured at a measuring position adjacent to the measuring position at the same time as cross points and calculates tilts of two axes with respect to the plane to be measured and a direction with respect to an advancing direction at each of the measuring positions based on a distance measurement result at the cross points and a defecting direction of the distance measuring lights of when the arithmetic control module measures the cross points.

Further, in the laser scanner according to a preferred embodiment, the arithmetic control module performs the circular scanning to the plane to be measured with at least two distance measuring lights, calculates tilting directions and tilting amounts with respect to the plane to be measured for each of the distance measuring lights and averages each of the tilting directions and the tilting amounts.

Further, in the laser scanner according to a preferred embodiment, the arithmetic control module prepares an intensity map based on a reflected light amount of the distance measuring lights of when the distance measurement is performed along each of the loci, extracts tangential components from the intensity map acquired at the predetermined measuring position, extracts tangential components from the intensity map acquired at the measuring position adjacent to the measuring position and calculates a moving amount and a tilt and displacements of a rotation angle by a comparison between each of the tangential components.

Further, in the laser scanner according to a preferred embodiment, the optical axis deflector is constituted of a pair of optical prisms which are individually rotatable and over-lap each other, and each of the optical prisms has a distance measuring light deflector which is formed at a central part of the optical axis deflector and deflects the distance measuring lights at a deflection angle as required in a direction as required and a reflected distance measuring light deflector which is formed at an outer peripheral part of the optical axis deflector and deflects the reflected distance measuring lights at the same deflection angle in the same direction as the distance measuring light deflector.

Further, in the laser scanner according to a preferred embodiment, the distance measuring unit has a light receiving means for receiving each of the distance measuring lights for each of the distance measuring lights.

Furthermore, a surveying system according to the present invention comprises a moving body which enables to move autonomously or by a remote control, the laser scanner provided on the moving body, a position measuring device for measuring a three-dimensional position of the moving body, and a control device for controlling a movement of the moving body, wherein the laser scanner enables to two-dimensionally scan a plane to be measured at a known deflection angle with at least two distance measuring lights at the same time, and the control device calculates tilts of two axes with respect to the plane to be measured and a direction of the moving body with respect to an advancing direction based on a measurement result of the plane to be measured by each of the distance measuring lights.

According to the present invention, the laser scanner comprises a distance measuring light projecting unit having a projecting optical axis and having light emitters for emitting at least two distance measuring lights at a known deflection angle with respect to the projecting optical axis, a distance measuring unit for receiving at least two reflected distance measuring lights and performing a distance measurement, respectively, an optical axis deflector provided on a common optical path of the distance measuring lights and the reflected distance measuring lights and for deflecting optical axes of the distance measuring lights and the reflected distance measuring lights at the same deflection angle in the same direction, a motor for rotating the optical axis deflector with the common optical path as a center, a projecting direction detecting module for detecting a deflection angle and a deflecting direction by the optical axis deflector, and an arithmetic control module, wherein the arithmetic control module performs a two-dimensional scanning with the distance measuring lights by a rotation of the optical axis deflector, draws at least two loci on a plane to be measured, and measures the plane to be measured along at least the two loci substantially at the same time by the distance measuring unit. As a result, an attitude detector need not to be additionally provided in order to acquire an attitude, a device configuration can be simplified, a manufacturing cost can be reduced, and a time for acquiring three-dimensional point cloud data can be shortened.

Further, according to the present invention, the surveying system comprises a moving body which enables to move autonomously or by a remote control, the laser scanner provided on the moving body, a position measuring device for measuring a three-dimensional position of the moving body, and a control device for controlling a movement of the moving body, wherein the laser scanner enables to two-dimensionally scan a plane to be measured at a known deflection angle with at least two distance measuring lights at the same time, and the control device calculates tilts of two axes with respect to the plane to be measured and a direction of the moving body with respect to an advancing direction based on a measurement result of the plane to be measured by each of the distance measuring lights. As a result, the attitude detector for acquiring an attitude of the laser scanner need not to be additionally provided, the laser scanner can be simplified, the manufacturing cost can be reduced, and the time for acquiring the three-dimensional point cloud data of the plane to be measured can be shortened.

DETAILED DESCRIPTION OF THE PREFERRED EMBODIMENT

A description will be given below on embodiments of the present invention by referring to the attached drawings.

Figure 1:
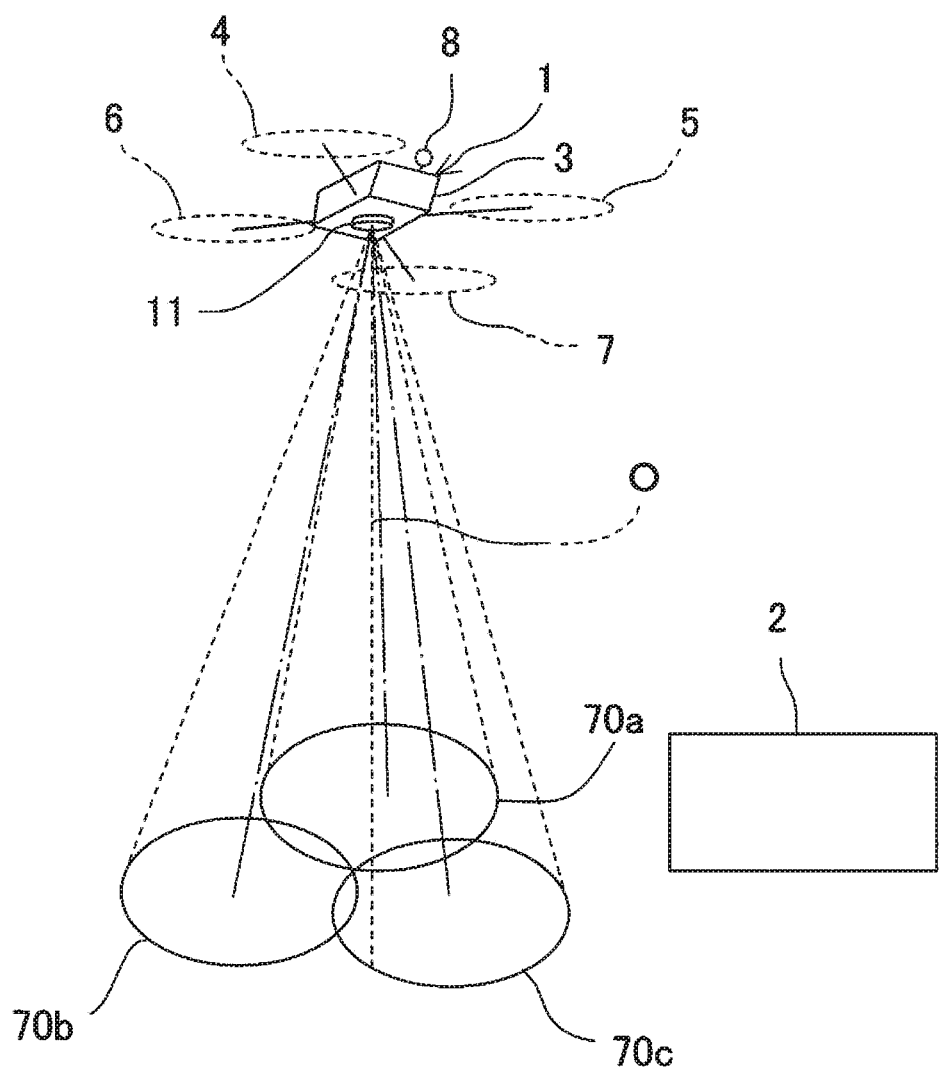
FIG. 1 is a schematical block diagram to show a surveying system according to an embodiment of the present invention.

FIG. 1 is a schematical block diagram of a surveying system in which a laser scanner according to a first embodiment of the present invention is used in a moving body, for instance, a flying vehicle. In FIG. 1, a reference numeral 1 denotes an unmanned aerial vehicle (hereinafter referred as a UAV) which enables to autonomously fly or be remotely controlled, and a reference numeral 2 denotes a base station control device installed on a ground. The base station control device 2 can perform a data communication with the UAV 1 and executes a control of a flight of the UAV 1 and a setting and a change of a flight plan. Further, the base station control device 2 stores and manages an information collected by the UAV 1 and executes a three-dimensional measurement of a range to be measured based on the information as stored.

By referring to FIG. 1 and FIG. 2, a description will be given on an outline configuration of the UAV 1.

The UAV 1 is, for instance, a helicopter as a small flying vehicle which can autonomously fly. The UAV 1 is operated by a remote control from the base station control device 2. Alternatively, the flight plan is set in a control device 13 of the UAV 1 from the base station control device 2, and the UAV 1 autonomously flies according to the flight plan.

The UAV 1 has propeller units 4, 5, 6 and 7 provided at forward ends of the necessary number (preferably an even number, and four in the drawing) of rod-like frames extending in a radial direction from a machine body 3, respectively. The propeller units 4, 5, 6 and 7 are arranged to be independently controlled and driven. The propeller units 4, 5, 6 and 7 and a flight controller (to be described later) and the like which drive and control the propeller units 4, 5, 6 and 7 make up a navigating means of the flying vehicle.

Since the flight controller individually controls the propeller units 4, 5, 6 and 7, the UAV 1 can perform flights as desired, such as an ascent, a descent, a turning, a direct advance, a backward movement and a hovering.

A GNSS (Global Navigation Satellite System) device 8 is mounted on the machine body 3 of the UAV 1 as a position measuring device which measures a position of the UAV 1.

The GNSS device 8 is configured to measure a reference position, for instance, a machine center of the UAV 1. Further, the GNSS device 8 measures three-dimensional absolute coordinates of the reference position, and a measured value indicates a ground coordinate system and an altitude obtained from a geocentric coordinate (absolute coordinate) system.

Figure 2:
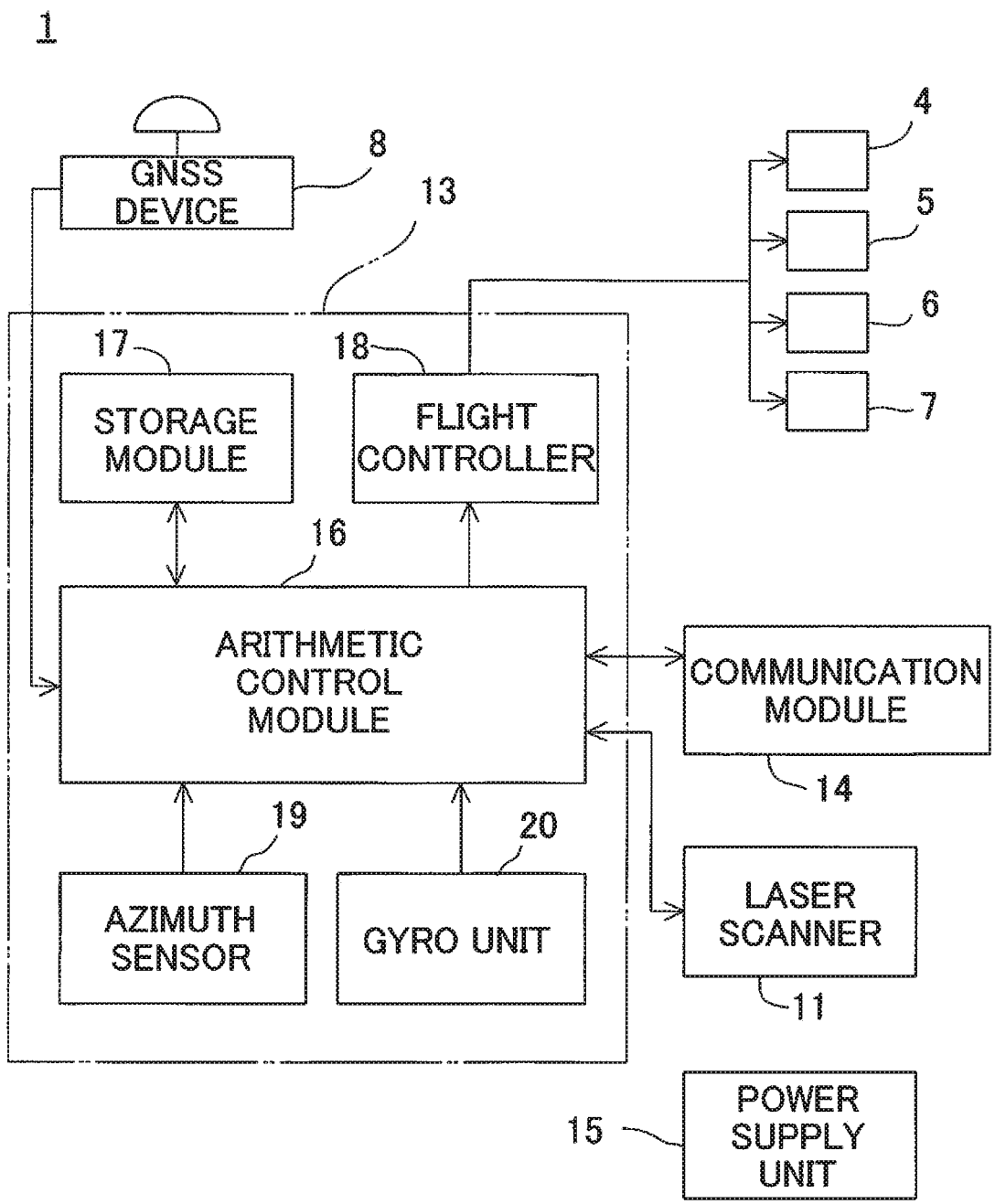
FIG. 2 is a schematical block diagram of a UAV used in the present embodiment.

As shown in FIG. 2, besides the GNSS device 8, a laser scanner 11, the control device 13, a communication module 14, a power supply unit 15 and the like are mounted on the UAV 1.

The laser scanner 11 is provided at a known position (a known distance from the machine center) and in a known attitude with respect to the machine center of the UAV 1. A reference optical axis O of the laser scanner 11 is provided so as to face a vertically downward direction when the UAV 1 takes a horizontal attitude. Further, the laser scanner 11 continuously pulsed-emits or burst-emits the necessary number, for instance, three of distance measuring lights. Each of the distance measuring lights circularly scans a plane to be measured and can obtain three-dimensional coordinates of the plane to be measured for each of the distance measuring lights. It is to be noted that a locus of each of the distance measuring lights on the plane to be measured overlaps each other by a predetermined amount.

Further, in such a manner that the laser scanner 11 burst-emits the distance measuring lights, the distance measuring lights have two characteristics, i.e., a modulated light and a pulsed light. It is to be noted that Japanese Patent Laid-open Publication No. 2016-151423 discloses a burst emission of distance measuring lights.

A time of when the measurement is performed by the laser scanner 11 is acquired from the GNSS device 8. A distance measurement result and an angle measurement result (measurement results) by the laser scanner 11 are associated with the geocentric coordinates (three-dimensional coordinates) measured by the GNSS device 8 and stored in a storage module 17 (to be described later).

Next, a description will be given on the control device 13. The control device 13 has an arithmetic control module 16, the storage module 17, a flight controller 18, an azimuth sensor 19 and a gyro unit 20.

In the storage module 17, the measurement results by the laser scanner 11 are stored in association with the time of when the measurement is performed by the laser scanner 11. Further, three-dimensional coordinates of the UAV 1 are measured by the GNSS device 8 in synchronization with the time of when the measurement is performed by the laser scanner 11, and the three-dimensional coordinates measured by the GNSS device 8 are also stored in the storage module 17 in association with the time of when the measurement is performed by the laser scanner 11.

Further, in the storage module 17, various programs such as a three-dimensional position measurement program, a calculation program, a flight control program, a flight attitude control program, a communication control program, and the like are stored.

Further, flight plan data is stored in the storage module 17. It is to be noted that, as data included in the flight plan data, there are, for instance, a flight course, a flight altitude, a photographing place, a range, and the like.

The three-dimensional position measurement program is configured to calculate a three-dimensional position of the UAV 1 based on a time and a positional information acquired from the GNSS device 8 and convert the measurement results by the laser scanner 11 to the geocentric coordinates based on the three-dimensional position of the UAV 1.

The flight attitude control program is configured to control an attitude of the UAV 1 based on detection signals from the azimuth sensor 19 and the gyro unit 20.

A description will be given on details of the laser scanner 11 in FIG. 3.

The laser scanner 11 comprises a distance measuring light projecting unit 46, a light receiving unit 47, a distance measurement calculating module 48, an image pickup unit 49, a projecting direction detecting module 51, a motor driver 52, a tilt sensor 53, a communication module 54, an arithmetic control module 55, a storage module 56 and an image pickup control module 57. These components are stored and integrated in a casing 58. It is to be noted that the distance measuring light projecting unit 46, the light receiving unit 47, the distance measurement calculating module 48 and the like make up a distance measuring unit as an electronic distance meter.

The distance measuring light projecting unit 46 has a projection optical axis 62, light emitters 63*a*, 63*b* and 63*c*, and projecting lenses 65*a*, 65*b* and 65*c*. The light emitters 63*a*, 63*b* and 63*c* and projecting lenses 65*a*, 65*b* and 65*c* are arranged with reference to the projection optical axis 62 (as a center).

The light emitters 63*a*, 63*b* and 63*c* are disposed in a circumferential direction with the projection optical axis 62 as a center at an equal angular pitch, for instance, a pitch of 120°. Optical axes of the light emitters 63*a*, 63*b* and 63*c* are provided at positions tilting with respect to the projection optical axis 62 at a predetermined angle, for instance, 15°. That is, the light emitters 63*a*, 63*b* and 63*c* are arranged at vertices of a triangle with the projection optical axis 62 as the center, and the light emitters 63*a*, 63*b* and 63*c* are conjugate regarding photodetectors 75*a*, 75*b* and 75*c* (to be described later). Further, the projecting lenses 65*a*, 65*b* and 65*c* are provided on the optical axes of the light emitters 63*a*, 63*b* and 63*c*, respectively.

Further, the projection optical axis 62 is deflected by a first reflection mirror 66 as a deflection optical component provided on the projection optical axis 62 and a second reflection mirror 68 as a deflection optical component provided on a light receiving optical axis 67 (to be described later) so as to coincide with the light receiving optical axis 67. The first reflection mirror 66 and the second reflection mirror 68 make up a projection optical axis deflector. It is to be noted that the optical axes of the light emitters 63*a*, 63*b* and 63*c* cross each other on the second reflection mirror 68, for instance.

The light emitters 63*a*, 63*b* and 63*c* emit pulsed laser beams. The distance measuring light projecting unit 46 projects the pulsed laser beams emitted from the light emitters 63*a*, 63*b* and 63*c* as distance measuring lights 69*a*, 69*b* and 69*c*, respectively. It is to be noted that FIG. 3 shows the distance measuring light 69*a* only.

Next, a description will be given on the light receiving unit 47. Reflected distance measuring lights 71*a*, 71*b* and 71*c* (only the reflected distance measuring light 71*a* is shown in FIG. 3) which are reflected by the plane to be measured (i.e., a measuring point) enter the light receiving unit 47. The light receiving unit 47 has the light receiving optical axis 67. As described above, the light receiving optical axis 67 coincides with the projection optical axis 62 deflected by the first reflection mirror 66 and the second reflection mirror 68. It is to be noted that an optical axis of a state where the projection optical axis 62 coincides with the light receiving optical axis 67 is determined as a distance measuring optical axis 72.

On the distance measuring optical axis 72, i.e., on a common optical path of the distance measuring lights 69a, 69b and 69c and the reflected distance measuring lights 71a, 71b and 71c, an optical axis deflector 73 (to be described later) is disposed. A straight optical axis passing through a center of the optical axis deflector 73 is the reference optical axis O. The reference optical axis O coincides with the distance measuring light optical axis 72 and with the projection optical axis 62 or the light receiving optical axis 67 of when is not deflected by the optical axis deflector 73.

An image forming lens 74 is disposed on the light receiving optical axis 67 which passes through the optical axis deflector 73 and enters, i.e., on the reference optical axis O. Further, the three photodetectors 75a, 75b and 75c, for instance, avalanche photodiodes (APD) are provided on optical axes tilted from the light receiving optical axis 67 at a predetermined angle, for instance, 15° and at positions in the circumferential direction at an equal angular pitch, i.e., the pitch of 120°. That is, the photodetectors 75a, 75b and 75c are arranged in an equilateral-triangular shape with the light receiving optical axis 67 as the center.

A position of the light emitter 63a is located at a position conjugated with the photodetector 75a regarding the projecting lens 65a and the image forming lens 74. Similarly, a position of the light emitters 63b and 63c are located at positions conjugated with the photodetectors 75b and 75c regarding the projecting lenses 65b and 65c and the image forming lens 74. Therefore, the distance measuring light 69a emitted from the light emitter 63a is received by the photodetector 75a. Further, the distance measuring light 69b emitted from the light emitter 63b is received by the photodetector 75b. Further, the distance measuring light 69c emitted from the light emitter 63c is received by the photodetector 75c.

The photodetectors 75a, 75b and 75c produce light receiving signals, respectively. Each of the light receiving signals is input to the distance measurement calculating module 48. The distance measurement calculating module 48 performs a distance measurement to the measuring point based on the light receiving signals, respectively.

The optical axis deflector 73 is a disk-like optical prism 76 and arranged on the light receiving optical axis 67 so as to be orthogonal to the light receiving optical axis 67. Further, the optical prism 76 is molded by an optical glass, for instance, and has three triangular prisms 77a, 77b and 77c which are arranged in parallel to each other and have the same deflection angle. It is to be noted that a width of the triangular prism 77a located at the center is larger than a beam diameter of each of the distance measuring lights 69a, 69b and 69c, and the distance measuring lights 69a, 69b and 69c can pass through the triangular prism 77a only.

A central part of the optical axis deflector 73 is designed as a distance measuring light deflector which is a first optical axis deflector which the distance measuring lights 69a, 69b and 69c pass through and are emitted from. A part except the central part of the optical axis deflector 73 is designed as a second optical axis deflector and also a reflected distance measuring light deflector which the reflecting distance measuring lights 71a, 71b and 71c enter and pass through.

The optical prism 76 is disposed so as to be rotatable with the light receiving optical axis 67 as the center. In such a manner that the motor driver 52 controls a rotating direction, a rotation amount and a rotating speed of the optical prism 76, the optical prism 76 deflects the distance measuring lights 69a, 69b and 69c as emitted in an arbitrary direction and deflects the light receiving optical axis 67 of the distance measuring lights 71a, 71b and 71c as received in parallel to the projection optical axis 62.

Figure 4A:
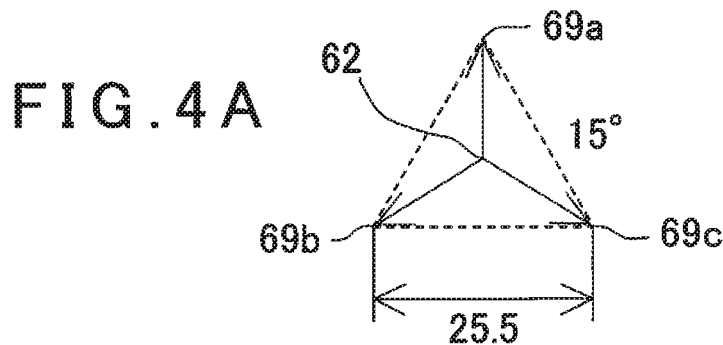
FIG. 4A is an explanatory drawing to show a relationship between a projection optical axis and each distance measuring optical axis.

In a state where the distance measuring lights 69a, 69b and 69c maintain a relationship between each of the optical axes, that is, a state where the distance measuring lights 69a, 69b and 69c are deflected in the circumferential direction with the projection optical axis 62 as the center at an equal angular interval and at a predetermined angle, for instance, 15°, with respect to the projection optical axis 62, the distance measuring lights 69a, 69b and 69c are deflected by the distance measuring light deflector. At this time, as shown in FIG. 4A, the optical axes of the distance measuring lights 69a, 69b and 69c cross each other at one point on the projection optical axis 62. Each of an angle formed between the optical axes of the distance measuring lights 69a and 69b adjacent to each other, an angle formed between the optical axes of the distance measuring lights 69b and 69c adjacent to each other, and an angle formed between the optical axes of the distance measuring lights 69c and 69a adjacent to each other are 25.5°, respectively.

Figure 4B:
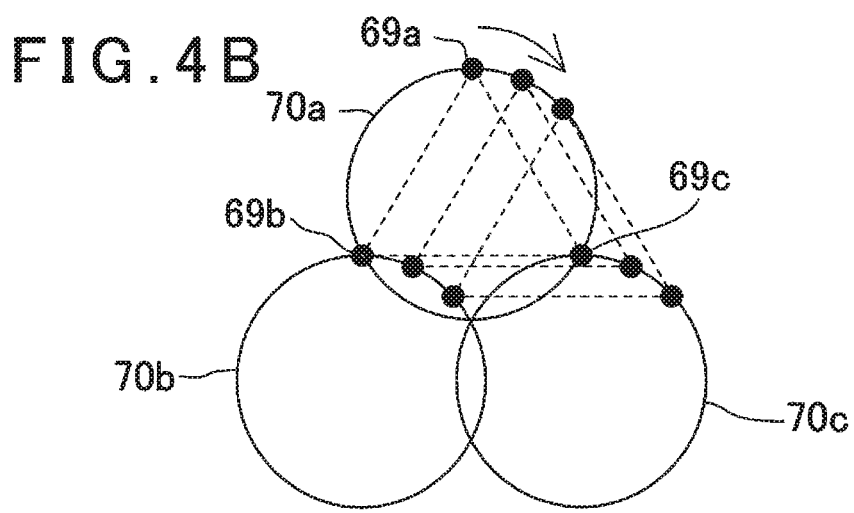
FIG. 4B is an explanatory drawing to show a scanning mode by each distance measuring light.

Further, when the optical prism 76 is rotated, as shown in FIG. 4B, the distance measuring lights 69a, 69b and 69c integrally rotate in a state where the relationship between each of the optical axes is maintained and draw circular loci 70a, 70b and 70c on a surface of the plane to be measured, respectively. At this time, each of the loci 70a, 70b and 70c overlap the adjacent loci 70a, 70b and 70c by a predetermined amount, respectively. Further, when the loci 70a, 70b and 70c overlap each other, two intersection points are produced between the adjacent loci 70a, 70b and 70c.

An outer shape of the optical prism 76 is designed in a circular shape with the light receiving optical axis 67 (the reference optical axis O) at the center. Taking an expansion of each of the reflected distance measuring lights 71a, 71b and 71c into consideration, a diameter of the optical prism 76 is set so that a sufficient light amount can be obtained.

A ring gear 78 is fitted with an outer periphery of the optical prism 76. A driving gear 79 meshes with the ring gear 78, and the driving gear 79 is fixed to an output shaft of a motor 81. The motor 81 is electrically connected with the motor driver 52. It is to be noted that the driving gear 79 and the motor 81 are provided at positions not interfering with the distance measuring light projecting unit 46, for instance, on a lower side of the ring gear 78.

As the motor 81, a motor which can detect a rotation angle or a motor which rotates corresponding to a driving input value, e.g., a pulse motor is used. Alternatively, by using a rotation angle detector which detects the rotation amount (the rotation angle) of the motor, for instance, an encoder or the like, a rotation amount of the motor 81 may detected. When the rotation amount of the motor 81 is detected, the motor 81 is controlled by the motor driver 52. Further, the encoder may be directly attached to the ring gear 78 so that a rotation angle of the ring gear 78 are directly detected by the encoder. In the following description, a description will be given on a case where the rotation angle of the ring gear 78 is detected by the encoder (not shown).

The projecting lenses 65a, 65b and 65c, the first reflection mirror 66, the second reflection mirror 68, the distance measuring light deflector and the like make up a light projecting optical system, and the reflected distance measuring light deflector, the image forming lens 74 and the like make up a light receiving optical system.

The distance measurement calculating module 48 controls the light emitters 63a, 63b and 63c and makes the light emitters 63a, 63b and 63c pulsed-emit or burst-emit the laser beams as the distance measuring lights 69a, 69b and 69c. When the distance measuring lights 69a, 69b and 69c are passed through the distance measuring light deflector and emitted and the optical axis deflector 73 is rotated by the motor 81, the distance measuring lights 69a, 69b and 69c are rotatably scanned at the same time and at the same timing.

Figure 5A:
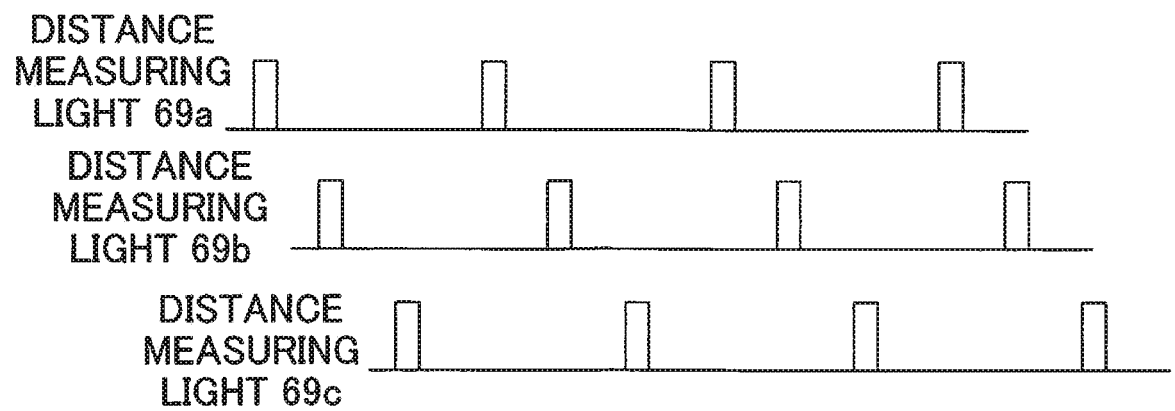
FIG. 5A is an explanatory drawing to show a light emission timing of each distance measuring light.
Figure 5B:
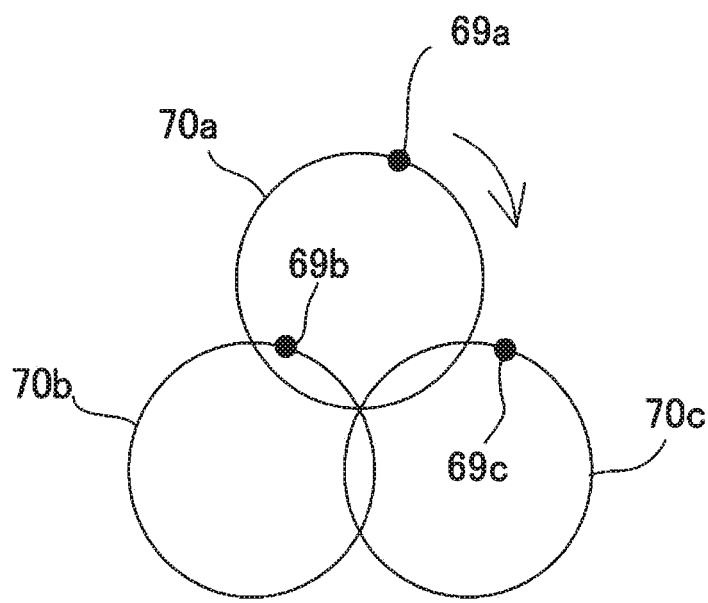
FIG. 5B is an explanatory drawing to show a position of an irradiating point of each distance measuring light on each locus.

As shown in FIG. 5A, the light emitters 63a, 63b and 63c make the distance measuring lights 69a, 69b and 69c pulsed-emit or burst-emit by a time division, for instance, at an interval of 50 KHz, and by shifting a light emission timing, respectively. It is to be noted that it would suffice if the interval of the time division interval is longer than a time for reciprocating the distance measuring lights 69a, 69b and 69c. Thereby, a distance measurement can be performed while separating for each of the distance measuring lights 69a, 69b and 69c, and the distance measurement at three measurement points located on the loci 70a, 70b and 70c as shown in FIG. 5B can be performed individually and substantially at the same time.

It is to be noted that, in a case where a measurement is executed while the laser scanner 11 is moving, when the light emission timing of the distance measuring lights 69a, 69b and 69c are sufficiently faster than a moving speed of the laser scanner 11, the distance measurement at the three points can be considered to be performed at the same time.

The reflected distance measuring lights 71a, 71b and 71c reflected at the measuring points enter through the reflected distance measuring light deflector and the image forming lens 74 and are received by the photodetectors 75a, 75b and 75c. Since the light emitters 63a, 63b and 63c are located at the positions conjugated with the photodetectors 75a, 75b and 75c, respectively, for instance, the light receiving signal emitted from the photodetector 75a can be identified as a signal of the distance measuring light 69a emitted from the light emitter 63a.

The photodetectors 75a, 75b and 75c send the light receiving signals to the distance measurement calculating module 48, respectively, and the distance measurement calculating module 48 performs the distance measurement to the measuring points for each pulsed light based on the light receiving signals from the photodetectors 75a, 75b and 75c. Distance measurement data of when the distance measurement calculating module 48 executed the distance measurement is stored in the storage module 56.

The projecting direction detecting module 51 counts driving pulses input to the motor 81 and detects a rotation angle of the motor 81. Alternatively, the projecting direction detecting module 51 detects the rotation angle of the motor 81 based on a signal from the encoder. Further, the projecting direction detecting module 51 calculates a rotational position of the optical prism 76 based on the rotation angle of the motor 81. Further, the projecting direction detecting module 51 calculates a deflection angle and a projecting direction of each of the distance measuring lights 69a, 69b and 69c for each pulsed light based on a refractive index and the rotational position of the optical prism 76. A calculation result (an angle measurement result) by the projecting direction detecting module 51 is associated with a distance measurement result by the distance measurement calculating module 48 and input to the arithmetic control module 55. Further, in a case where the distance measuring lights 69a, 69b and 69c are burst-emitted, the distance measurement is carried out for each intermittent distance measuring light.

The arithmetic control module 55 calculates a horizontal angle and a vertical angle of each of the measuring points based on the deflection angle and the projecting direction of each of the distance measuring lights 69a, 69b and 69c. Further, the arithmetic control module 55 associates the horizontal angle and the vertical angle with the distance measurement data with respect to each of the measuring points. Thereby, three-dimensional data of the plane to be measured can be acquired.

Figure 3:
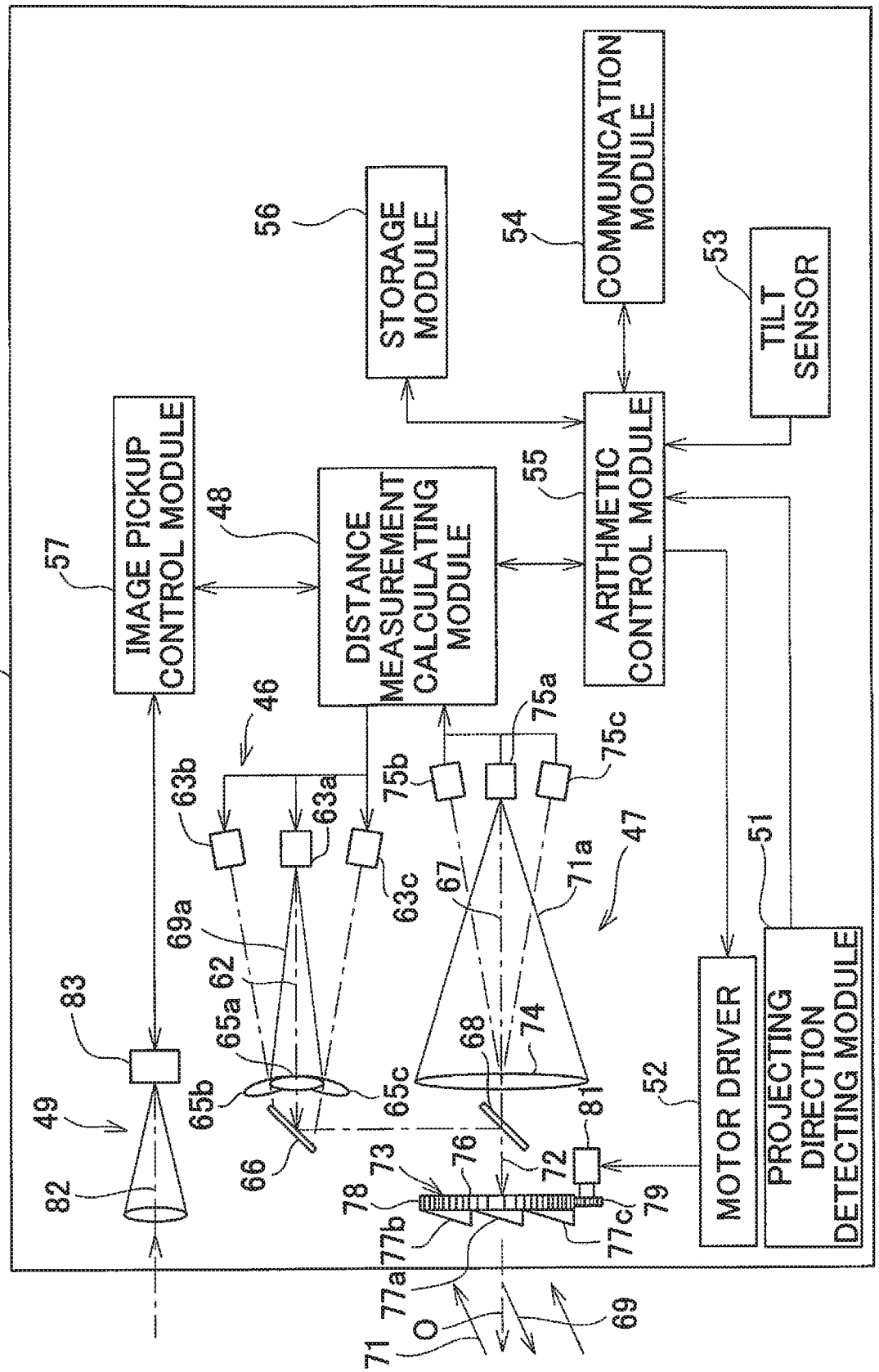
FIG. 3 is a block diagram to show an optical system of a laser scanner according to a first embodiment of the present invention.

In the laser scanner 11 as shown in FIG. 3, a case where the tilt sensor 53 is housed in the casing 58 is shown. The tilt sensor 53 can detect an absolute horizontality and can detect a tilt of the laser scanner 11 with respect to a horizontality. That is, the tilt sensor 53 can detect a tilt of the UAV 1 with respect to the horizontality.

Figure 4C:
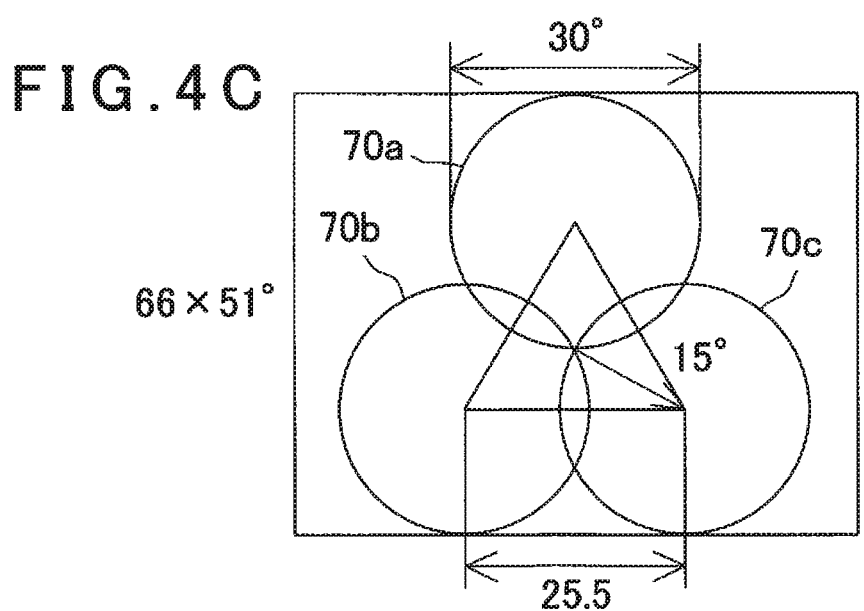
FIG. 4C is an explanatory drawing to show a relationship between a locus of each distance measuring light and a field angle of an image pickup unit.

The image pickup unit 49 has an image pickup optical axis 82 which is parallel to the reference optical axis O of the laser scanner 11. The image pickup unit 49 is a camera having a field angle including all of the loci 70a, 70b and 70c, for instance, a field angle of 66×51°, as shown in FIG. 4C. A relationship (a distance) between the image pickup optical axis 82 and the projection optical axis 62 and a relationship (a distance) between the image pickup optical axis 82 and the reference optical axis O are known. Further, the image pickup unit 49 can acquire video images or continuous images.

The image pickup control module 57 controls an image pickup of the image pickup unit 49. In a case where the image pickup unit 49 picks up the video images or the continuous images, the image pickup control module 57 synchronizes a timing of acquiring frame images which make up the video images or the continuous images with a timing of scanning by the laser scanner 11. The arithmetic control module 55 also executes an association with the image and measurement data.

An image pickup element 83 of the image pickup unit 49 is a CCD or a CMOS sensor which is an aggregate of pixels, and it is so arranged that a position of each pixel on an image element can be specified. For instance, each pixel has pixel coordinates in a coordinate system with the image pickup optical axis 82 as an origin point, and the position of each pixel on the image element can be specified by the pixel coordinates. Therefore, in such a manner that the arithmetic control module 55 associates the image with the measurement data, an image with three-dimensional data, which has three-dimensional data for each pixel, can be prepared.

The communication module 54 can communicate with the communication module 14 of the UAV 1 or the base station control device 2. The communication module 54 can transmit and receive an information such as three-dimensional coordinates collected by the UAV 1 or various data such as a distance measurement result or an angle measurement result (a measurement result) measured by the laser scanner 11, and issue a flight control instruction to the UAV 1 from the base station control device 2 or a measurement instruction to the laser scanner 11.

In the storage module 56, various programs are stored. These programs include: a program for controlling the light emission timings of the light emitters 63a, 63b and 63c, a program for controlling the rotation of the optical axis deflector 73, a program for executing the distance measurement based on light receiving timings and light velocities of the reflected distance measuring lights 71a, 71b and 71c, respectively, a program for executing an angle measurement based on the refractive index and the rotational position of the optical prism 76, a program for calculating the three-dimensional data of the plane to be measured based on the distance measurement result and the angle measurement result, a program for controlling the image pickup by the image pickup unit 49, a program for detecting an attitude of the laser scanner 11, a program for preparing the image with the three-dimensional data which has the three-dimensional coordinates for each pixel based on the three-dimensional data of the plane to be measured and an image of the plane to be measured, a program for controlling a communication between the UAV 1 and the base station control device 2, and other programs.

Each of the programs stored in the storage module 56 is executed or opened by the arithmetic control module 55 or the like, and various processings are carried out. Further, in the storage module 56, a distance measurement result and a reflected light amount of each of the distance measuring lights 69a, 69b and 69c by the distance measurement calculating module 48 and a projecting direction in the distance measurement detected by the projecting direction detecting module 51 are stored while being associated with each other.

Next, a description will be given on a measurement operation by the laser scanner 11 mounted on the UAV by referring to FIG. 6A and FIG. 6B.

The arithmetic control module 16 executes a flight control program and a flight attitude control program. Further, the arithmetic control module 16 sends a flight control signal to the flight controller 18 based on the flight plan data. The flight controller 18 drives and controls the propeller units 4, 5, 6 and 7 based on the flight control signal.

The flight controller 18 controls an attitude and a flight state of the UAV 1 based on the detection signal from the azimuth sensor 19 and the detection signal from the gyro unit 20. The arithmetic control module 16 makes the UAV 1 fly in a flight course as set at an altitude as set via the flight controller 18 according to the flight plan data.

In parallel with the flight of the UAV 1, the arithmetic control module 55 continuously makes the distance measuring lights 69a, 69b and 69c pulsed-emit or burst-emit from the light emitters 63a, 63b and 63c. Further, the arithmetic control module 55 rotates and drives the optical axis deflector 73, circularly scans the ground which is the plane to be measured with the distance measuring lights 69a, 69b and 69c, and performs the distance measurement.

Figure 7:
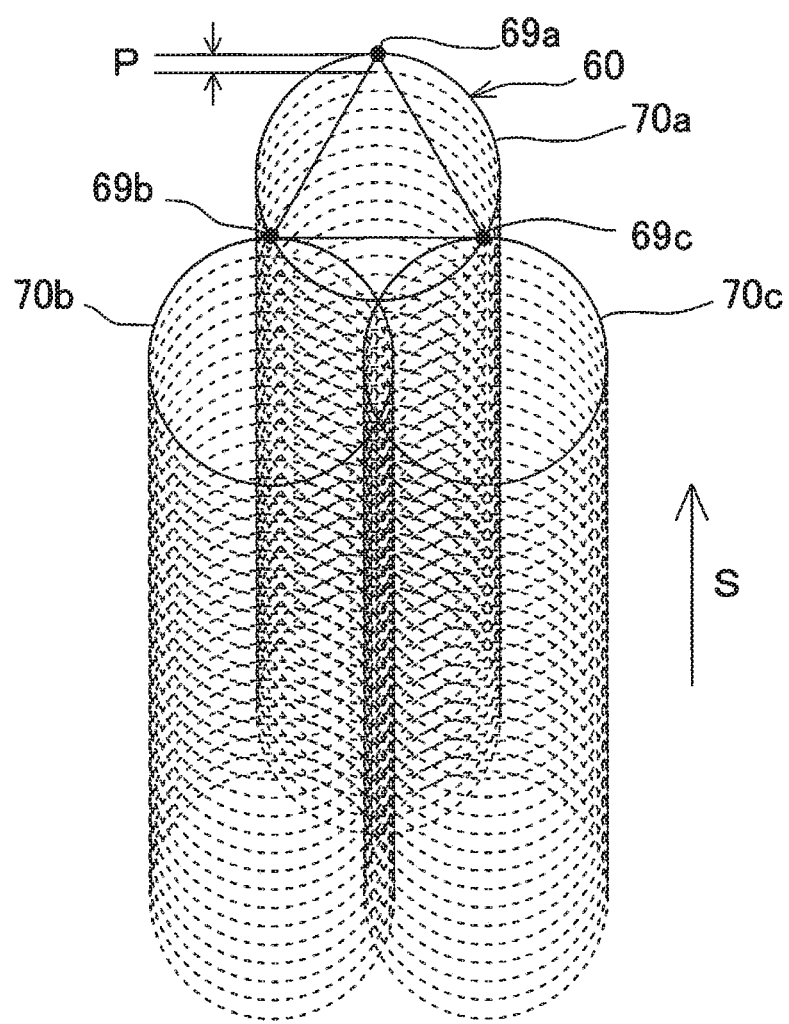
FIG. 7 is an explanatory drawing to show scanning loci obtained by performing a measurement in parallel with a flight of a flying vehicle.

For instance, in a case where an altitude of the UAV 1 is set 50 m, a rotating speed (a scanning cycle) of the optical prism 76 is set 0.03 sec (1800 rpm), and a moving speed of the UAV 1 is set 2 m/sec, as shown in point cloud data 60 in FIG. 7, a diameter of each of the loci 70a, 70b and 70c of the distance measuring lights 69a, 69b and 69c on the plane to be measured is approximately 25 m, and a scanning pitch P in an advancing direction S is approximately 6 cm.

At this time, since the rotating speed of the optical prism 76 is sufficiently faster than the moving speed of the UAV 1 and a light emission cycle of the distance measuring lights 69a, 69b and 69c as emitted while delaying a timing by the time division is sufficiently short, a positional displacement between each of the distance measuring lights caused by a movement of the UAV 1 can be ignored. Therefore, the distance measurement at the intersection points of the loci 70a, 70b and 70c by the distance measuring lights 69a, 69b and 69c can be considered as a distance measurement performed substantially at the same time and at the same point.

Figure 6A:
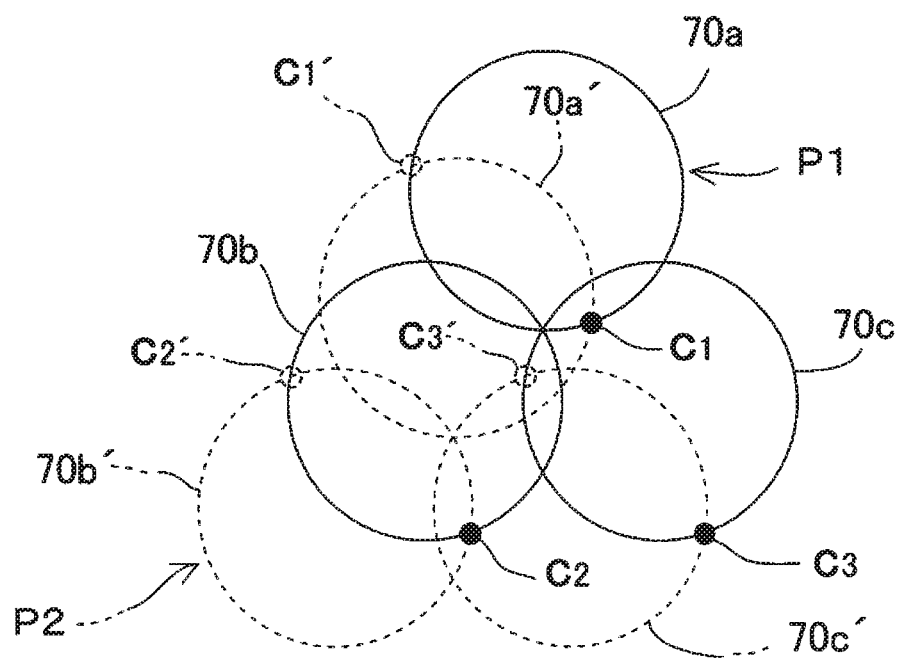
FIG. 6A is an explanatory drawing to show a state where loci obtained at two measuring positions adjacent to each other cross.

In FIG. 6A, a solid line indicates the loci 70a, 70b and 70c obtained by scanning the plane to be measured by the laser scanner 11 when the UAV 1 is located at P1, and a broken line indicates the loci 70a', 70b' and 70c' obtained by scanning the plane to be measured by the laser scanner 11 when the UAV 1 is located at a next adjacent measuring point P2.

Here, a scanning pitch of the laser scanner 11 in the advancing direction is sufficiently smaller than the diameter of each of the loci 70a, 70b and 70c. Therefore, the loci 70a, 70b and 70c cross the loci 70a', 70b' and 70c' respectively at three points. The points where the loci cross each other will be referred as cross points hereinafter.

In FIG. 6A, each point shown by a black circle indicates one of the cross points, i.e., a cross point C1 of the loci 70a and 70a', a cross point C2 of the loci 70b and 70b' and a cross point C3 of the loci 70c and 70c'. Further, each point shown by a white circle indicates the other of each cross points, i.e., a cross point C1' of the loci 70a and 70a', a cross point C2' of the loci 70b and 70b' and a cross point C3' of the loci 70c and 70c'.

The projecting direction of each of the distance measuring lights 69a, 69b and 69c can be calculated by the projecting direction detecting module 51 based on an angle (15° in the above description) formed between each of the distance measuring lights 69a, 69b and 69c and the reference optical axis O and the rotational position of the optical prism 76, i.e., a value of the encoder (not shown) provided on the optical prism 76. Therefore, a height of the UAV 1 and a horizontal distance with respect to the UAV 1 are known based on the distance measurement by scanning and the value of the encoder, and three-dimensional coordinates of the cross points (C1, C2, C3) and the cross points (C1', C2', C3') can be obtained by a calculation by the arithmetic control module 55.

It is to be noted that the cross points (C1, C2, C3) and the cross points (C1', C2', C3') obtained by the calculation by the arithmetic control module 55 will be referred as virtual cross points (K1, K2, K3) (not shown) and virtual cross points (K1', K2', K3') (not shown) in the following description, respectively.

Since an attitude of the UAV 1 while flying is unstable and the plane to be measured is not necessarily horizontal, the measurement is normally performed in a state where one or both of the UAV 1 and the plane to be measured tilt.

Therefore, in a case where the UAV 1 and the plane to be measured tilt, the loci 70a, 70b and 70c and the loci 70a', 70b' and 70c' become elliptical with respect to a horizontal plane. For this reason, a deviation occurs between three-dimensional coordinates of the virtual cross points (K1, K2, K3) and the virtual cross points (K1', K2', K3') and three-dimensional coordinates of actual cross points (C1, C2, C3) and actual cross points (C1', C2', C3) at which the loci 70a, 70b and 70c cross the loci 70a', 70b' and 70c' on the plane to be measured.

Figure 6B:
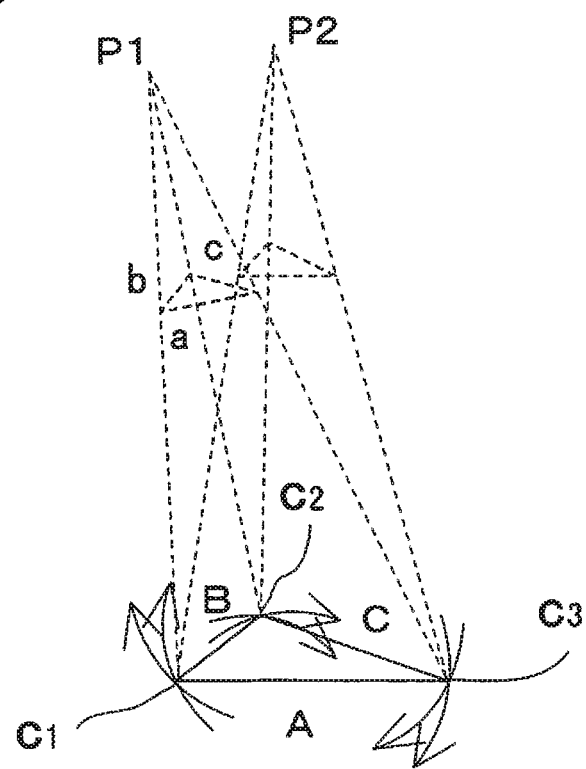
FIG. 6B is an explanatory drawing to show a state where cross points are measured at the two measuring positions adjacent to each other.

FIG. 6B shows a state where the actual cross points (C1, C2, C3) are connected with lines A, B and C as an example. A side length B between C1 and C2, a side length C between C2 and C3, and a side length A between C3 and C1 can be respectively calculated based on a distance measurement result of when the actual cross points (C1, C2, C3) are measured and a projecting direction (an angle measurement result) at a time of the distance measurement.

The actual cross points (C1, C2, C3) are points on the loci 70a, 70b and 70c and the loci 70a', 70b' and 70c', and a value of each of the side length A, the side length B and the side length C are the same even in a case where the actual cross points (C1, C2, C3) are measured from either P1 or P2.

Therefore, the arithmetic control module 55 can obtain points where the side length A, the side length B and the side length C become equal to each other as the actual cross points (C1, C2, C3) based on a measurement result of when the loci 70a, 70b and 70c are scanned from P1 and a measurement result of when the loci 70a', 70b' and 70c' are scanned from P2.

Further, the arithmetic control module 55 can obtain a change in the attitude of when the UAV 1 moved from P1 to P2, i.e., a displacement in tilts of two axes of the UAV 1 with respect to the plane to be measured and a displacement in a direction (a rotation angle) of the UAV 1 with respect to the advancing direction based on the distance measurement result at the actual cross points (C1, C2, C3) and the projecting directions of each of the distance measuring lights 69a, 69b and 69c in the distance measurement.

Further, the arithmetic control module 55 can sequentially calculate the cross points between the measuring positions adjacent to each other and calculate the tilts of the two axes of the UAV 1 with respect to the plane to be measured and the direction of the UAV 1 with respect to the advancing direction at each of the measuring positions. Thereby, the laser scanner 1 can acquire accurate three-dimensional point cloud data of the plane to be measured.

Since the scanning pitch is small, a fluctuation in a distance measurement value for each scanning is not caused by a change in a ground surface but caused by a fluctuation in the attitude of the UAV 1. Therefore, by averaging the measurement values, an influence of the fluctuation in the attitude of the UAV 1 is eliminated, and the ground surface can be accurately measured by the laser scanner 11.

Further, when the attitude detection (a tilt with respect to the ground surface) by the laser scanner 11 is compared with the absolute horizontality detected by the tilt sensor 53, an accurate point cloud of each of the horizontality and the verticality can be obtained.

As described above, in the first embodiment, when the plane to be measured is scanned by the laser scanner 11 mounted on the UAV 1, the arithmetic control module 55 calculates positions of the cross points at which the loci of the distance measuring lights 69a, 69b and 69c obtained at the predetermined measuring position cross the loci of the distance measuring lights 69a, 69b and 69c obtained at the measuring positions adjacent to each other, and obtains the tilts of the two axes of the UAV 1 with respect to the plane to be measured and a direction with respect to the advancing direction based on the measurement results of the cross points by the laser scanner 11.

Therefore, in order to obtain the attitude of the UAV 1, there is no need to use an attitude detector or an image pickup unit for acquiring an image of the plane to be measured and perform a photogrammetry, and the attitude detector or the image pickup unit can be omitted as a basic structure. When the attitude detector or the image pickup unit is omitted, a device configuration can be simplified, and a manufacturing cost can be reduced.

Further, in the first embodiment, the distance measuring light projecting unit 46 has the light emitters 63a, 63b and 63c, and the light emitters 63a, 63b and 63c emit the distance measuring lights 69a, 69b and 69c, respectively.

Therefore, the scanning and the measurement can be performed at the same time by scanning with three circles, a time for acquiring three-dimensional point cloud data can be reduced, and a point cloud density can be improved.

Further, although the virtual cross points (K1, K2, K3) do not coincide with the actual cross points (C1, C2, C3), the actual cross points (C1, C2, C3) are located in a vicinity of the virtual cross points (K1, K2, K3).

Therefore, by setting so that the arithmetic control module 55 searches for the actual cross points (C1, C2, C3) at which the side length A, the side length B and the side length C become equal to each other with the virtual cross points (K1, K2, K3) as base points, a calculation load on the arithmetic control module 55 can be reduced, and a calculation time can be shortened.

It is to be noted that, in the first embodiment, although the three light emitters 63a, 63b and 63c are provided, the number of the light emitters may be two or four or more. At this time, similar to the first embodiment, an optical axis of the distance measuring light emitted from each light emitter is tilted with respect to the reference optical axis O. In a case where the number of the light emitters is two, since the number of the cross points is two, and it would suffice if points on the loci at which lengths of straight lines connecting two points become equal to each other are obtained as the cross points. Further, in a case where the number of the light emitters is four, since the number of the cross points is four, it would suffice if points on the loci at which four side lengths become equal to each other are obtained as the cross points.

Further, in the first embodiment, each of the cross points (C1, C2, C3) shown by the black circle in FIG. 6A in each of the two cross points produced by overlapping the circular scannings is obtained, and the tilts of the two axes of the UAV 1 with respect to the plane to be measured and the direction of the UAV 1 with respect to the advancing direction are calculated by the arithmetic control module 55. On the other hand, it is needless to say that each of the cross points (C1', C2', C3') shown by the white circle may be obtained and the tilts of the two axes of the UAV 1 with respect to the plane to be measured and the direction of the UAV 1 with respect to the advancing direction may be calculated by the arithmetic control module 55.

Figure 8A:
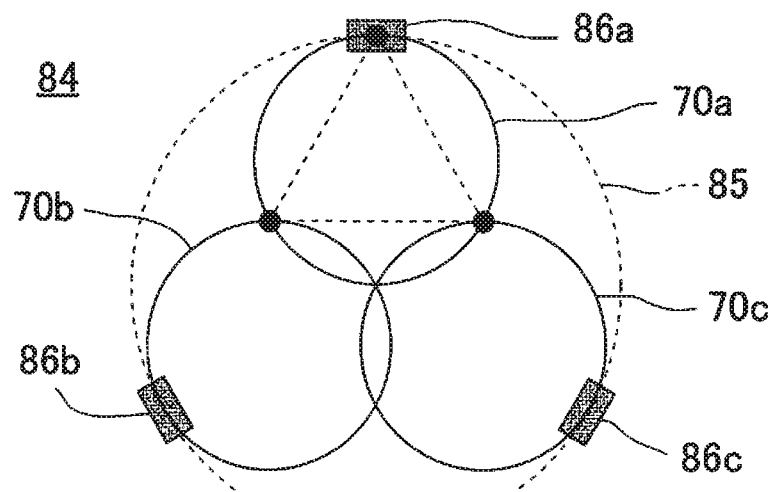
FIG. 8A is an explanatory drawing to show circle tangential components in an intensity map.
Figure 8B:
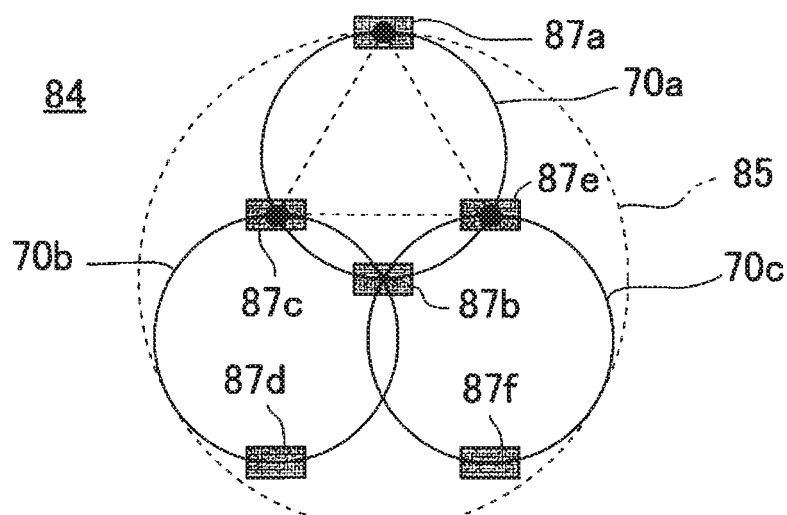
FIG. 8B is an explanatory drawing to show X tangential components in the intensity map.
Figure 8C:
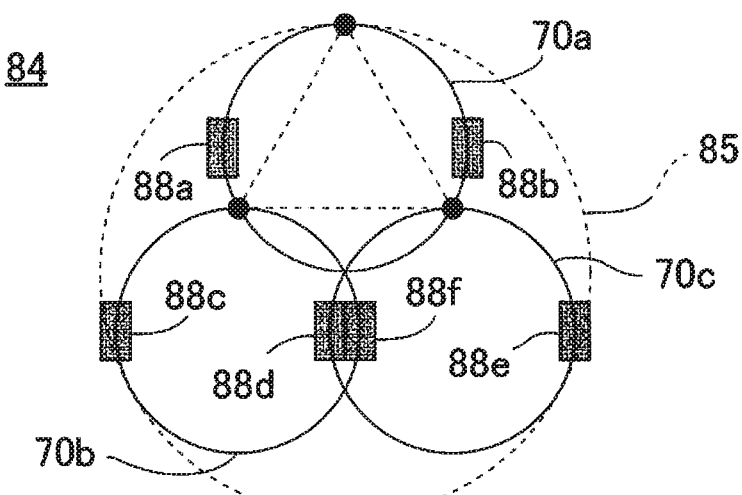
FIG. 8C is an explanatory drawing to show Y tangential components in the intensity map.

FIG. 8A to FIG. 8C show another example in order to calculate a tilt, a rotation and a moving amount of the UAV 1 with respect to the advancing direction.

The laser scanner 11 emits the distance measuring lights 69a, 69b and 69c with respect to the plane to be measured and receives the reflected lights from irradiating points by the photodetectors 75a, 75b and 75c, and distance measurement values at the irradiating points can be obtained based on the light receiving signals as emitted. Further, each of the light receiving signals includes an information of a light amount of each of the reflected lights, and an intensity information (reflected light amount information) at each of the irradiating points can be acquired from the light receiving signals.

Therefore, the intensity information can be acquired along each of the loci 70a, 70b and 70c every time the arithmetic control module 55 makes the optical prism 76 rotate one around at a predetermined measuring position. That is, an intensity map 84 which is an aggregate of three circular intensity information can be acquired. It is to be noted that the intensity map 84 can be also used as a black-and-white image.

When the intensity map 84 for one cycle is acquired, the arithmetic control module 55 sets a circumcircle 85 circumscribed around the loci 70a, 70b and 70c as shown in FIG. 8A. The arithmetic control module 55 extracts an intensity information of a part (a circle tangential component 86a) where the locus 70a touches the circumcircle 85, an intensity information of a part (a circle tangential component 86b) where the locus 70b touches the circumcircle 85, and an intensity information of a part (a circle tangential component

86*c*) where the locus 70*c* touches the circumcircle 85 from the intensity map 84, respectively.

Similarly, at a measuring position adjacent to the predetermined measuring position, the arithmetic control module 55 acquires an intensity map 84' (not shown) and extracts an intensity information of each circle tangential components 86*a'*, 86*b'* and 86*c'* (not shown) from the intensity map 84', respectively.

A reflected light amount from the same irradiating point and a reflected light amount from a vicinity of this irradiation point become the same light amount even if the scanning is repeated. Therefore, when the arithmetic control module 55 compares the light amount obtained at the predetermined measuring position with the light amount obtained at the adjacent measuring point, a sameness of the irradiating points can be judged.

When the intensity information of each of the circle tangential component 86*a*, 86*b* and 86*c* and the intensity information of each of the circle tangential component 86*a'*, 86*b'* and 86*c'* are considered as two-dimensional patterns and the arithmetic control module 55 acquires a correlation between the patterns, the arithmetic control module 55 can obtain a rotation amount (a displacement of a rotation angle) of each of the circle tangential components 86*a'*, 86*b'* and 86*c'* with respect to each of the circle tangential components 86*a*, 86*b* and 86*c*. Further, the arithmetic control module 55 can obtain a tilt amount of the laser scanner 11 from an interval information of the circle tangential components 86*a*, 86*b* and 86*c* at each of the measuring points.

Further, as shown in FIG. 8B, the arithmetic control module 55 extracts, from the intensity map 84 at the predetermined measuring position, an intensity information of X tangential components 87*a* and 87*b* of the locus 70*a*, an intensity information of the X tangential components 87*c* and 87*d* of the locus 70*b*, and an intensity information of X tangential components 87*e* and 87*f* of the locus 70*c*, respectively.

Similarly, at the measuring position adjacent to the predetermined measuring position, the arithmetic control module 55 extracts an intensity information of X tangential components 87*a'* to 87*f'* (not shown) from the intensity map 84.

When each of the intensity information of the X tangential components 87*a* to 87*b* and each of the intensity information of the X tangential components 87*a'* to 87*f'* are considered as two-dimensional patterns, respectively and the arithmetic control module 55 acquires a correlation between the patterns, the arithmetic control module 55 can obtain a moving amount of each of the X tangential components 87*a'* to 87*f'* with respect to each of the X tangential components 87*a* to 87*f* in an X direction.

Further, as shown in FIG. 8C, the arithmetic control module 55 extracts, from the intensity map 84 at the predetermined measuring position, an intensity information of Y tangential components 88*a* and 88*b* of the locus 70*a*, an intensity information of Y tangential components 88*c* and 88*d* of the locus 70*b*, and an intensity information of Y tangential components 88*e* and 88*f* of the locus 70*c*, respectively.

Similarly, at the measuring position adjacent to the predetermined measuring position, the arithmetic control module 55 extracts an intensity information of Y tangential components 88*a'* to 88*f'* (not shown).

When each of the intensity information of the Y tangential components 88*a* to 88*f* and each of the intensity information of the Y tangential component 88*a'* to 88*f'* are considered as two-dimensional patterns, respectively and the arithmetic control module 55 acquires a correlation between the patterns, the arithmetic control module 55 can obtain a moving amount of each of the Y tangential components 88*a'* to 88*f'* with respect to each of the Y tangential components 88*a* to 88*f* in a Y direction.

Therefore, the arithmetic control module 55 calculates a correlation between the intensity information of the circle tangential components 86*a* to 86*c* and the intensity information of the circle tangential components 86*a'* to 86*c'*, calculates a correlation between the intensity information of the X tangential components 87*a* to 87*f* and the intensity information of the X tangential components 87*a'* to 87*f'*, and calculates a correlation between the intensity information of the Y tangential components 88*a* to 88*f* and the intensity information of the Y tangential components 88*a'* to 88*f'*. As a result, the arithmetic control module 55 can calculate a tilt, a rotation amount and a moving amount in X-Y directions of the UAV 1 of when the UAV 1 moved from the predetermined measuring position to the adjacent measuring position.

It is to be noted that, in another example described above, although the arithmetic control module 55 calculates the tilt, the rotation amount and the moving amount in the X-Y directions of the UAV 1 based on the intensity information of the circle tangential components 86, the intensity information of the X tangential components 87 and the intensity information of the Y tangential components 88, the distance measurement values may be used.

In a case where the distance measurement values are used, similar to the intensity information, the arithmetic control module 55 calculates a correlation between distance measurement values of the circle tangential components 86*a* to 86*c* and distance measurement values of the circle tangential components 86*a'* to 86*c'*, calculates a correlation between distance measurement values of the X tangential components 87*a* to 87*f* and distance measurement values of the X tangential components 87*a'* to 87*f'*, and calculates a correlation between distance measurement values of the Y tangential components 88*a* to 88*f* and distance measurement values of the Y tangential components 88*a'* to 88*f'*. As a result, the arithmetic control module 55 can calculate a tilt, a rotation amount (a displacement of a rotation angle) and a moving amount in the X-Y directions of the UAV 1 of when the UAV 1 moved from the predetermined measuring position to the adjacent measuring position.

It is to be noted that, as described above, the intensity map 84 can be also used as the black-and-white image. A relationship between the image pickup optical axis 82 and the projecting optical axis 62 and a relationship between the image pickup optical axis 82 and the reference optical axis O are known, and a light amount information of an image as picked up is the same as a light amount information of the intensity map 84. Therefore, the arithmetic control module 55 can easily match a picked-up image of the image pickup unit 49 with the intensity map 84 based on the light amount information of the intensity map 84 and the light amount information (the intensity information) of the picked-up image by the image pickup unit 49. Therefore, a color information of the picked-up image can be transferred to the intensity map 84, and the intensity map 84 can be converted to a colored image in which three-dimensional coordinates are given to each pixel.

Figure 9:
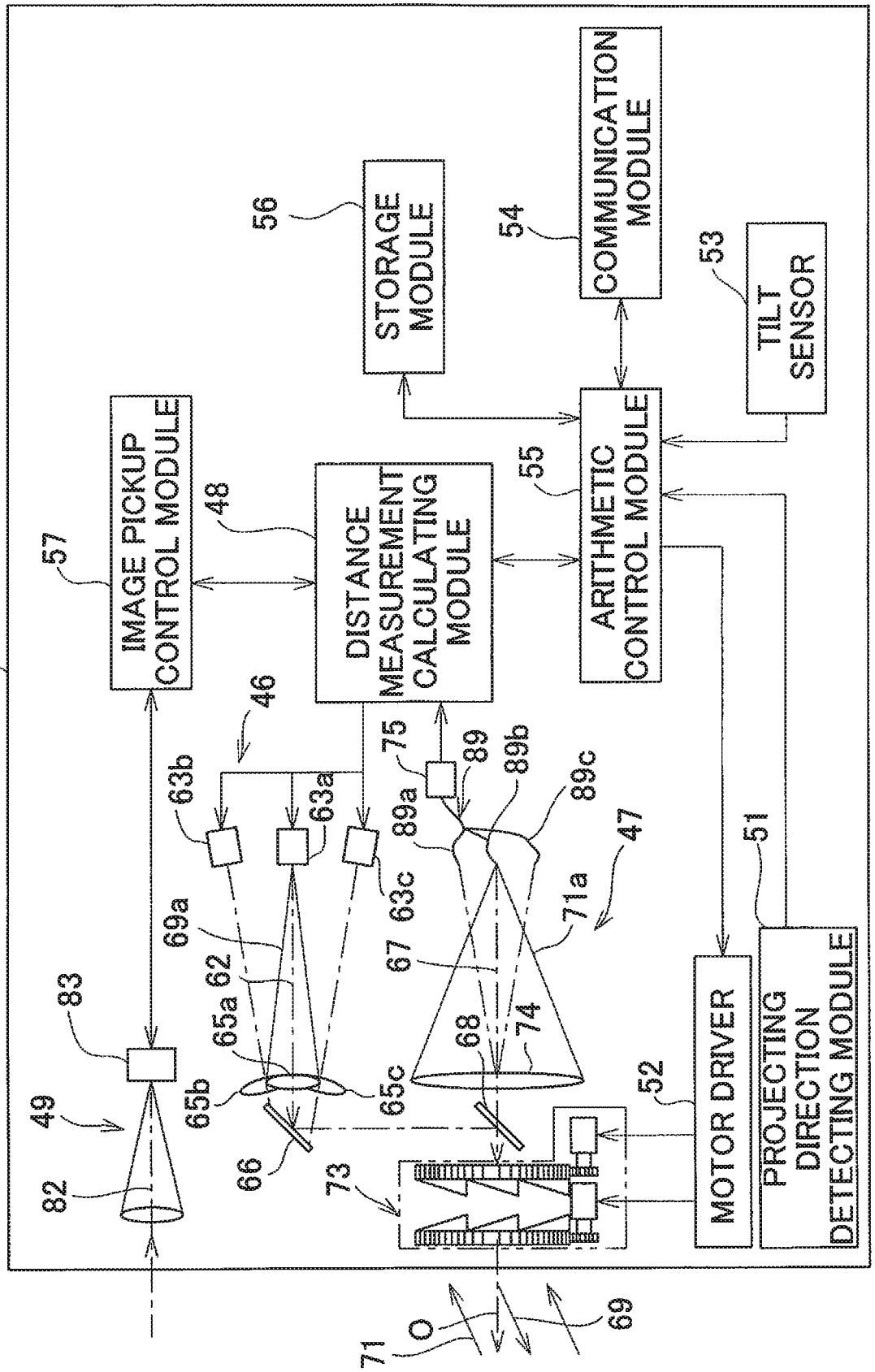
FIG. 9 is a block diagram to show an optical system of a laser scanner according to a second embodiment of the present invention.
Figure 10:
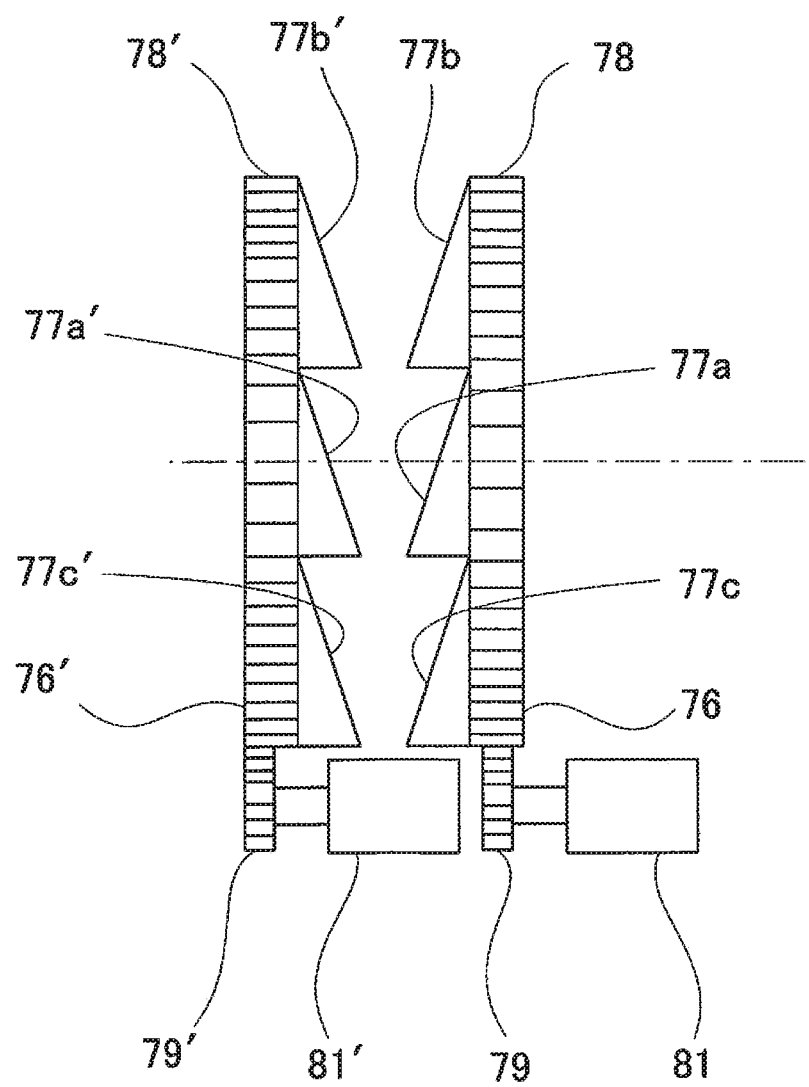
FIG. 10 is an enlarged view of an optical axis deflector in the optical system.

Next, a description will be given on a laser scanner 11 according to a second embodiment of the present invention in FIG. 9 and FIG. 10. It is to be noted that, in FIG. 9, what are equivalent to components as shown in FIG. 3 are referred by the same symbol, and a description thereof will be omitted.

In the laser scanner 11, an optical axis deflector 73 is constituted of two optical prisms 76 and 76' having the same optical characteristics.

The optical prisms 76 and 76' are disposed concentrically and reflection-symmetry. That is, the optical prisms 76 and 76' are disposed parallel in such a manner that triangular prisms 77a to 77c face the triangular prisms 77a' to 77c' and also disposed on a light receiving optical axis 67 so as to be orthogonal to the light receiving optical axis 67. The triangular prisms 77a and 77a' at a center make up a distance measuring light deflector which distance measuring lights 69a, 69b and 69c (only the distance measuring light 69a is shown in FIG. 9) pass through, and the triangular prisms 77b and 77b' and the triangular prisms 77c and 77c' make up a reflected distance measuring light deflector which reflected distance measuring lights 71a, 71b and 71c (only the reflected distance measuring light 71a is shown in FIG. 9) pass through.

The optical prisms 76 and 76' are provided so as to be individually rotatable with the light receiving optical axis 67 as the center, respectively. By individually controlling rotating directions, rotation amounts, and rotating speeds of the optical prisms 76 and 76' by an arithmetic control module 55, the optical prisms 76 and 76' deflect a projecting optical axis 62 in an arbitrary direction and deflects the light receiving optical axis 67 passing through the optical prisms 76 and 76' in parallel to the projecting optical axis 62.

Ring gears 78 and 78' are fitted to outer peripheries of the optical prisms 76 and 76', respectively. Driving gears 79 and 79' mesh with the ring gears 78 and 78', respectively, and the driving gears 79 and 79' are fixed to output shafts of the motors 81 and 81', respectively. Further, the motors 81 and 81' are electrically connected to a motor driver 52.

A projecting direction detecting module 51 counts the driving pulses input to the motors 81 and 81' and detects rotation angles of the motors 81 and 81'. Alternatively, the projecting direction detecting module 51 detects the rotation angles of the motors 81 and 81' based on a signal from an encoder. Further, the projecting direction detecting module 51 calculates deflection angles and deflecting directions of distance measuring lights 69a, 69b and 69c based on the rotation angles of the motors 81 and 81'.

The optical prisms 76 and 76' can change the distance measuring lights 69a, 69b and 69c as emitted in an arbitrary direction at an arbitrary deflection angle by a combination of rotational positions.

Figure 11:
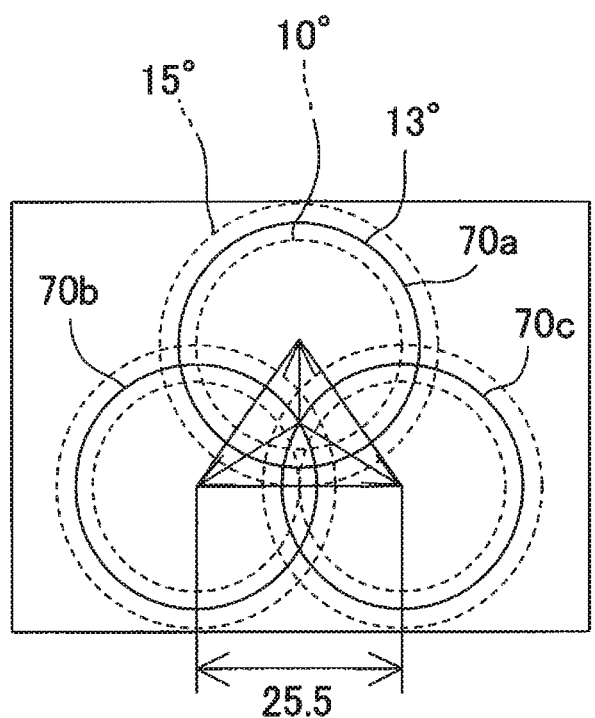
FIG. 11 is an explanatory drawing to show a state where a diameter of each locus is changed by a relative movement of optical prisms.

For instance, when the optical prisms 76 and 76' are integrally rotated in a state where a positional relationship, i.e., deflection angles of the optical prisms 76 and 76', are fixed, each loci drawn by the distance measuring lights 69a, 69b and 69c becomes circular. Further, when a rotational position relationship of the optical prisms 76 and 76' is changed, a diameter of each of the circular loci 70a, 70b and 70c can be changed as shown in FIG. 11.

Further, when rotating directions and rotating speeds of the optical prisms 76 and 76' are individually controlled and the optical prisms 76 and 76' are relatively rotated, the distance measuring lights 69a, 69b and 69c can be scanned in various states such as a linear pattern, a concentric and multi-circular pattern, a spiral pattern, a petal pattern, and the like.

The laser scanner 11 has one photodetector 75, the light emitters 63a, 63b and 63c, and optical fibers 89a, 89b and 89c which are equal to the light emitters 63a, 63b and 63c in number. One end of each of the optical fibers 89a, 89b and 89c is an incident end, and each incident end surface is provided at a position where each of the reflected distance measuring lights 71a, 71b and 71c is focused by an image forming lens 74. Each emitting end portions of the optical fibers 89a, 89b and 89c is bundled to form one composite optical fiber 89, and the reflected distance measuring lights 71a, 71b and 71c enter the photodetector 75 through the composite optical fiber 89. Here, each of the incident end faces of each of the optical fibers 89a, 89b and 89c are conjugated with each of the light emitters 63a, 63b and 63c.

The distance measuring lights 69a, 69b, and 69c are controlled by the arithmetic control module 55 so as to pulsed-emit or burst-emit while shifting a light emission timing. Therefore, the photodetector 75 does not receive the reflected distance measuring lights 71a, 71b and 71c at the same time, and a distance measurement can be performed at three points.

In the second embodiment, by changing the positional relationship of the optical prisms 76 and 76', diameters of circles of the loci 70a, 70b and 70c can be changed as shown in FIG. 11. Therefore, the diameters of the loci 70a, 70b and 70c can be changed according to a field angle of an image pickup unit 49 or an altitude of a UAV 1, for instance, and three-dimensional point cloud data can be efficiently acquired.

Further, by relatively rotating the optical prisms 76 and 76', a shape of each of the loci 70a, 70b and 70c can be changed. As a result, when a shape of each of the loci 70a, 70b and 70c is changed according to an intended usage, the three-dimensional point cloud data can be efficiently acquired.

Further, in the second embodiment, the reflected distance measuring lights 71a, 71b and 71c are received by using the composite optical fiber 89 as trifurcated, respectively. As a result, it would suffice if the photodetector 75 is one, and a manufacturing cost of the laser scanner 11 can be reduced.

It is to be noted that the reflected distance measuring lights 71a, 71b and 71c may be made to individually enter the photodetector 75 from three optical fibers without using the composite optical fiber 89 in which the emitting end portions are bundled. In this case, as the photodetector 75, a multi-pixel APD or the like is used.

It is to be noted that, in the first embodiment and the second embodiment, although the description has been given on a case where the laser scanner 11 is mounted on the UAV 1 as a moving body, the moving body is not restricted to the UAV 1. For instance, the laser scanner 11 may be provided on any other moving bodies such as a construction machine and the like. Alternatively, it is needless to say that the laser scanner 11 may be installed on a rotation device which horizontally rotates.

Further, in the first embodiment and the second embodiment, although the three-dimensional coordinates of the UAV 1 are measured by the GNSS device 8, a three-dimensional coordinate measuring means of the UAV 1 is not restricted to the GNSS device 8. For instance, a retro-reflector such as a prism and the like may be provided on the UAV 1, the retro-reflector may be surveyed by a surveying instrument installed at a known point, and a three-dimensional position of the UAV 1 may be obtained.

The invention claimed is:

1. A laser scanner comprising a distance measuring light projecting unit having a projecting optical axis and having light emitters for emitting at least two distance measuring lights at a known deflection angle with respect to said projecting optical axis, a distance measuring unit for receiving at least two reflected distance measuring lights and performing a distance measurement, respectively, an optical axis deflector provided on a common optical path of said distance measuring lights and said reflected distance measuring lights and for deflecting optical axes of said distance measuring lights and said reflected distance measuring lights at the same deflection angle in the same direction, a motor for rotating said optical axis deflector with said common optical path as a center, a projecting direction detecting module for detecting a deflection angle and a deflecting direction by said optical axis deflector, and an arithmetic control module, wherein said arithmetic control module performs a two-dimensional scanning with said distance measuring lights by a rotation of said optical axis deflector, wherein each distance measuring light draws a respective locus of points, different from said locus of points drawn by other distance measuring light, such that said distance measuring light projecting unit draws at least two loci on a plane to be measured, and measures said plane to be measured along at least said two loci substantially at the same time by said distance measuring unit.

2. The laser scanner according to claim 1, wherein said distance measuring light projecting unit shifts light emission timings by a time division and pulsed-emits said distance measuring lights.

3. The laser scanner according to claim 2, wherein said distance measuring light projecting unit emits at least three distance measuring lights, each drawing a respective locus of points, and said arithmetic control module calculates, based on a distance measurement result of at least three points measured on each of said loci at the same time and a detection result of said projecting direction detecting module, distances and altitudes between each of said points and calculates a tilt and a rotation with respect to said plane to be measured based on a calculation result.

4. The laser scanner according to claim 3, wherein said two-dimensional scanning is a circular scanning.

5. The laser scanner according to claim 4, wherein said optical axis deflector is constituted of a pair of optical prisms which are individually rotatable and overlap each other, and each of said optical prisms has a distance measuring light deflector which is formed at a central part of said optical axis deflector and deflects said distance measuring lights at a deflection angle as required in a direction as required and a reflected distance measuring light deflector which is formed at an outer peripheral part of said optical axis deflector and deflects said reflected distance measuring lights at the same deflection angle in the same direction as said distance measuring light deflector.

6. The laser scanner according to claim 4, wherein said distance measuring unit has a light receiving means for receiving each of said distance measuring lights for each of said distance measuring lights.

7. A surveying system comprising a moving body which enables to move autonomously or by a remote control, said laser scanner according to claim 3 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

8. The laser scanner according to claim 2, wherein said two-dimensional scanning is a circular scanning.

9. The laser scanner according to claim 8, wherein said arithmetic control module calculates a point where a side length between at least two points on each of said respective loci measured at a predetermined measuring position at the same time becomes equal to a side length between at least two points on each of said respective loci measured at a measuring position adjacent to said measuring position at the same time as cross points and calculates tilts of two axes of said projecting optical axis with respect to said plane to be measured and a direction with respect to an advancing direction at each of said measuring positions based on a distance measurement result at said cross points and a deflecting direction of said distance measuring lights of when said arithmetic control module measures said cross points.

10. A surveying system comprising a moving body which enables to move autonomously or by a remote control, said laser scanner according to claim 9 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

11. The laser scanner according to claim 8, wherein said arithmetic control module performs said circular scanning to said plane to be measured with at least two distance measuring lights, calculates tilting directions and tilting amounts of said projecting optical axis with respect to said plane to be measured for each of said distance measuring lights and averages each of said tilting directions and said tilting amounts.

12. A surveying system comprising a moving body which enables to move autonomously or by a remote control, said laser scanner according to claim 11 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

13. The laser scanner according to claim 8, wherein said arithmetic control module prepares an intensity map based on a reflected light amount of said distance measuring lights of when the distance measurement is performed along each of said loci, extracts tangential components from said intensity map acquired at a predetermined measuring position, extracts tangential components from said intensity map acquired at a measuring position adjacent to said measuring position and calculates a moving amount of said laser scanner and a tilt and displacements of a rotation angle by a comparison between each of said tangential components.

14. A surveying system comprising a moving body which enables to move autonomously or by a remote control, said laser scanner according to claim 13 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

15. The laser scanner according to claim 8, wherein said optical axis deflector is constituted of a pair of optical prisms which are individually rotatable and overlap each other, and each of said optical prisms has a distance measuring light deflector which is formed at a central part of said optical axis deflector and deflects said distance measuring lights at a deflection angle as required in a direction as required and a reflected distance measuring light deflector which is formed at an outer peripheral part of said optical axis deflector and deflects said reflected distance measuring lights at the same deflection angle in the same direction as said distance measuring light deflector.

16. The laser scanner according to claim 8, wherein said distance measuring unit has a light receiving means for receiving each of said distance measuring lights for each of said distance measuring lights.

17. A surveying system comprising a moving body which enables to move autonomously or by a remote control, said laser scanner according to claim 8 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

18. A surveying system comprising a moving body which enables to move autonomously or by a remote control, said laser scanner according to claim 2 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

19. The laser scanner according to claim 1, wherein said optical axis deflector is constituted of a pair of optical prisms which are individually rotatable and overlap each other, and each of said optical prisms has a distance measuring light deflector which is formed at a central part of said optical axis deflector and deflects said distance measuring lights at a deflection angle as required in a direction as required and a reflected distance measuring light deflector which is formed at an outer peripheral part of said optical axis deflector and deflects said reflected distance measuring lights at the same deflection angle in the same direction as said distance measuring light deflector.

20. A surveying system comprising a moving body which enables to move autonomously or by a remote control, said laser scanner according to claim 19 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

21. The laser scanner according to claim 1, wherein said distance measuring unit has a light receiving means for receiving each of said distance measuring lights for each of said distance measuring lights.

22. A surveying system comprising a moving body which enables to move autonomously or by a remote control, said laser scanner according to claim 21 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

23. A surveying system comprising a moving body which enables to move autonomously or by a remote control, said laser scanner according to claim 1 provided on said moving body, a position measuring device for measuring a three-dimensional position of said moving body, and a control device for controlling a movement of said moving body, wherein said laser scanner enables to two-dimensionally scan a plane to be measured at a known deflection angle with at least two distance measuring lights at the same time, and said control device calculates tilts of two axes of said projecting optical axis with respect to said plane to be measured and a direction of said moving body with respect to an advancing direction based on a measurement result of said plane to be measured by each of said distance measuring lights.

* * * * *